US009828114B2

(12) United States Patent
Dinkelmann et al.

(10) Patent No.: US 9,828,114 B2
(45) Date of Patent: Nov. 28, 2017

(54) LUGGAGE PROCESSING STATION AND SYSTEM THEREOF

(71) Applicant: ICM AIRPORT TECHNICS AUSTRALIA PTY LTD, Mascot, NSW (AU)

(72) Inventors: Richard Dinkelmann, New South Wales (AU); Rainer Rudolf Dinkelmann, New South Wales (AU)

(73) Assignee: ICM AIRPORT TECHNICS AUSTRALIA PTY LTD, Mascot, NSW (AU)

( * ) Notice: Subject to any disclaimer, the term of this patent is extended or adjusted under 35 U.S.C. 154(b) by 0 days.

(21) Appl. No.: 15/625,315

(22) Filed: Jun. 16, 2017

(65) Prior Publication Data
US 2017/0283091 A1     Oct. 5, 2017

Related U.S. Application Data

(63) Continuation of application No. 15/119,290, filed as application No. PCT/AU2015/000114 on Feb. 27, 2015, now Pat. No. 9,714,099.

(30) Foreign Application Priority Data

Feb. 28, 2014    (AU) ................................ 2014900670
Mar. 21, 2014    (AU) ................................ 2014900987

(51) Int. Cl.
     *G06F 7/00*            (2006.01)
     *B64F 1/36*            (2017.01)
     (Continued)

(52) U.S. Cl.
     CPC ............... *B64F 1/368* (2013.01); *B07C 5/04* (2013.01); *G01B 11/02* (2013.01); *G01G 11/00* (2013.01);
     (Continued)

(58) Field of Classification Search
None
See application file for complete search history.

(56) References Cited

U.S. PATENT DOCUMENTS

| 4,137,567 A | 1/1979 | Grube |
| 4,416,435 A | 11/1983 | Szendrodi et al. |
| (Continued) | | |

FOREIGN PATENT DOCUMENTS

| CN | 102063751 A | 5/2011 |
| DE | 102012013247 A1 | 1/2014 |
| (Continued) | | |

OTHER PUBLICATIONS

"X-ray scanner for Airport Security—Unique Material Discrimination—IBS/Scantech", https://www.youtube.com/watch?v=-GZ9Rn29nJU, dated Nov. 22, 2008.
(Continued)

*Primary Examiner* — Yolanda Cumbess
(74) *Attorney, Agent, or Firm* — Kaplan Breyer Schwarz, LLP

(57) ABSTRACT

A processing station for registering a piece of passenger's luggage for a trip, wherein the processing station comprises: an injector for receiving the piece of luggage associated with the passenger; at least one sensor associated with the injector, the at least one sensor, in combination with at least the floor of the injector, creating a zone around the piece of luggage; and a controller associated with the sensor being adapted to: monitor, via the at least one sensor, intrusions through the zone to determine one or more of whether a predetermined limit on dimensions of the piece of luggage has been exceeded or whether a foreign object has intruded the zone from outside, and allow further processing of the piece of luggage only if no intrusion of the zone is detected;
(Continued)

and wherein the controller adjusts the area of the zone to accommodate different sizes of luggage.

18 Claims, 5 Drawing Sheets

(51) Int. Cl.
*B07C 5/04* (2006.01)
*G01G 11/00* (2006.01)
*G01B 11/02* (2006.01)
*G01G 19/52* (2006.01)
*G06Q 50/28* (2012.01)
*G01G 19/414* (2006.01)
*G06Q 10/02* (2012.01)

(52) U.S. Cl.
CPC ......... *G01G 19/4142* (2013.01); *G01G 19/52* (2013.01); *G06Q 10/02* (2013.01); *G06Q 50/28* (2013.01)

(56) References Cited

U.S. PATENT DOCUMENTS

| | | | |
|---|---|---|---|
| 4,792,018 | A | 12/1988 | Humble et al. |
| 4,832,203 | A | 5/1989 | Nozawa |
| 5,271,641 | A | 12/1993 | Whited |
| 5,301,790 | A | 4/1994 | Prydtz et al. |
| 5,576,692 | A | 11/1996 | Tompkins et al. |
| 5,793,639 | A | 8/1998 | Yamazaki |
| 5,866,888 | A | 2/1999 | Bravman et al. |
| 5,920,053 | A | 7/1999 | DeBrouse |
| 6,304,183 | B1 | 10/2001 | Causey |
| 6,507,278 | B1 | 1/2003 | Brunetti et al. |
| 6,698,653 | B1 | 3/2004 | Diamond et al. |
| 6,750,757 | B1 | 6/2004 | Gabig, Jr. et al. |
| 6,967,579 | B1 | 11/2005 | Elizondo |
| 6,975,221 | B2 | 12/2005 | Monck |
| 7,062,011 | B1 * | 6/2006 | Tybinkowski ....... G01N 23/046 378/57 |
| 7,164,747 | B2 | 1/2007 | Ellenbogen et al. |
| 7,447,562 | B2 | 11/2008 | Quackenbush et al. |
| 7,702,069 | B2 | 4/2010 | Panesar et al. |
| 7,777,629 | B2 | 8/2010 | Lee et al. |
| 7,802,724 | B1 | 9/2010 | Nohr |
| 7,991,242 | B2 * | 8/2011 | Perron ................ G06K 9/28 382/103 |
| 8,301,296 | B2 | 10/2012 | Brundmann et al. |
| 2002/0113715 | A1 | 8/2002 | Wilson |
| 2003/0061085 | A1 | 3/2003 | Lanigan, Sr. |
| 2003/0120510 | A1 | 6/2003 | Panek |
| 2004/0035928 | A1 | 2/2004 | Anderson |
| 2005/0065643 | A1 | 3/2005 | Elefante |
| 2005/0251430 | A1 | 11/2005 | Jindel |
| 2005/0271199 | A1 | 12/2005 | Collins, Jr. |
| 2006/0145856 | A1 * | 7/2006 | Tethrake ............ G08B 13/2462 340/572.1 |
| 2006/0266620 | A1 | 11/2006 | Hillmantel et al. |
| 2007/0116178 | A1 | 5/2007 | Hernandez Moysi |
| 2007/0133743 | A1 | 6/2007 | Johnson et al. |
| 2008/0024271 | A1 | 1/2008 | Oberman et al. |
| 2008/0198967 | A1 * | 8/2008 | Connelly ............ G01V 5/0016 378/57 |
| 2009/0268029 | A1 | 10/2009 | Haussmann et al. |
| 2010/0018839 | A1 * | 1/2010 | Tan ..................... B64F 1/366 198/507 |
| 2011/0266092 | A1 * | 11/2011 | Marquis ................ A47F 9/045 186/61 |
| 2012/0022684 | A1 | 1/2012 | Hernot |
| 2013/0105274 | A1 | 5/2013 | Piera Eroles et al. |
| 2013/0211864 | A1 | 8/2013 | Sanderson et al. |
| 2014/0188523 | A1 | 7/2014 | Levine et al. |
| 2015/0010128 | A1 * | 1/2015 | Drouin .................. G01N 23/046 378/57 |

FOREIGN PATENT DOCUMENTS

| | | |
|---|---|---|
| EP | 1725451 B1 | 6/2011 |
| JP | S6146591 A | 3/1986 |
| JP | H07061512 | 3/1995 |
| JP | H09118428 A | 5/1997 |
| JP | 2001213588 A | 8/2001 |
| JP | 2003223658 | 8/2003 |
| JP | 2003223658 A | 8/2003 |
| JP | 2004163342 | 6/2004 |
| JP | 2008233961 A | 10/2008 |
| JP | 2010152865 A | 7/2010 |
| KR | 1020060088356 A | 8/2006 |
| KR | 1020090022681 A | 3/2009 |
| WO | 9104554 A1 | 4/1991 |
| WO | 2005087590 A1 | 9/2005 |
| WO | 2008082300 A1 | 7/2008 |
| WO | 2013012321 A1 | 1/2013 |
| WO | 2013151436 A1 | 10/2013 |

OTHER PUBLICATIONS

"Air New Zealand Auckland Domestic Check-In", https://www.youtube.com/watch?v=fw0SDNzcasl, dated Jan. 29, 2010.
"Airport Baggage Handling—With Vaculex Solutions", http://cyberspaceandtime.com/Airport_Baggage_Handling-with_Vaculex_Solutions/NZSalh9SoTo.video, dated Feb. 13, 2017, Publisher: Vaculex.
"Airport Baggage System pushers", https://www.youtube.com/watch?v=9MZqiE3yGIQ, dated Sep. 11, 2010.
"Airport check-in, https://en.wikipedia.org/wiki/Airport_check-in", "Wikipedia", dated Nov. 23, 2016, Published in: US.
"Alis 400 Airport Luggage Identification System", integral.lv/datasheet/ALIS_Barcode_2011.pdf, dated Mar. 1, 2011, pp. 1-21, Publisher: SICK.
Norm Ross, "Navigating the Airport of Tomorrow", dated 2011, "Travel Tech Consulting", Publisher: Amadeus, Published in: US.
"Airport Baggage Handling, Screening, Sorting & Drop Off Systems", https://www.airport-suppliers.com/supplier/alstef-automation-s-a/, dated 2016, Publisher: ALSTEF Automation S.A.
"Airport: Thy Self Check-In", https://www.youtube.com/watch?v=tpoRh87nPeU, dated Mar. 22, 2009.
"Amadeus Airport Self-Service Bag Drop", https://www.youtube.com/watch?v=XI3LWuURQ10, dated Jun. 24, 2013.
Norm Rose, "The always-connected traveler: How mobile will transform the future of air travel", "Travel Tech Consulting", dated 2011, Publisher: Amadeus.
"Baggage Handling at Amsterdam Schiphol", https://www.youtube.com/watch?v=Cqejei5WNcw, dated Dec. 18, 2010.
"Bar Code Scanning Systems Automatic Identification Technology", Publisher: SICK, Published in: US.
"Check-in Demo.MP4", https://www.youtube.com/watch?v=KFtcNGtn0q0, dated Jan. 20, 2011.
"Make travelers love your airport.", http://www.dsg-bagdrop.com/, dated Aug. 16, 2016, Publisher: DSG BagDrop, Published in: NO.
Karim Nice, "How Baggage Handling Works", http://science.howstuffworks.com/transport/flight/modern/baggage-handling.htm, "How Stuff Works", accessed Dec. 15, 2016.
"How to check-in with Finnair: Check-In Kiosk", https://www.youtube.com/watch?v=GvvQLu3id4U, dated Feb. 18, 2012.
"How to check in Delta Airlines Kios and get the air ticket", https://www.youtube.com/watch?v=8sMnq2wpVYU, dated Jan. 25, 2009.
"How to Use the Check-In Kiosk at the Airport", https://www.youtube.com/watch?v=Jb4Ji0sUYoc, dated Jul. 7, 2008.
"ICM Airport Technics—A leader in self-service bag drop and baggage handling solutions", http://autobagdrop.com.au/, dated 2016, Published in: AU.
"Instruction Self service drop off baggage on Schiphol", https://www.youtube.com/watch?v=WGO9SmTrfV0, dated Jul. 24, 2009.
"Introducing Qantas Next Generation Check-in", https://www.youtube.com/watch?v=O-YznwL_nQs, dated Jul. 19, 2010.

(56) References Cited

OTHER PUBLICATIONS

Kiosk for Airline Bag Tag, https://www.youtube.com/watch?v=EuzyzeruqIQ, dated Jul. 9, 2008.
"Kiosk Self Check-in", https://www.youtube.com/watch?v=yqfYZMofaeU, dated Feb. 3, 2010.
Sarah Rich, "Marc Newson Designs RFID-Enabled, Lightning-quick Airplane Check-in", http://www.fastcodesign.com/1661950/marc-newson-designs-rfid-enabled-lightning-quick-airplane-check-in/, dated Jul. 21, 2010, Publisher: www.fastcodesign.com.
Ridhika Naidoo, "marc newson: next generation check in for quantas", http://www.designboom.com/design/marc-newson-, dated Jul. 27, 2010, Publisher: designboom.
"Modern Baggage Handling at Helsinki Airport", https://www.youtube.com/watch?v=1m2WPDXPYKo, dated Nov. 11, 2010.
"New check in process for WestJet in Calgary", https://www.youtube.com/watch?v=VsTZgXLLjNU, dated Nov. 8, 2010.
"New check in process for WestJet in Vancouver", https://www.youtube.com/watch?v=v1UgHtduUJ4, dated Aug. 24, 2010.
"Passenger Terminal Conference 2017", dated 2016, http://passengerterminal-expo.com/.
"Passengers and Baggage Processing Systems", dated 2010, http://www.seetekairportsolutions.com/ Passengers_Baggage_Processing_Systems.html, Publisher: Seetel S/A/.
"Qantas—Additional Baggage Allowance", http://www.qantas.com/travel/airlines/additional-baggage-terms/global/en, accessed Dec. 15, 2016, Publisher: Qantas, Published in: AU.
Dave Friedlos, "Qantas Launches Its Next Generation Check-in System", http://www.rfidjournal.com/articles/view?7761, dated Jul. 27, 2010, Publisher: RFID Journal LLC.
"Qantas Next Generation Check-In", dated 2016, http://www.griffithsbuilding.com.au/projects/qantas-next-generation-check/, Publisher: Griffiths, Published in: AU.
Raymond Kollau, "Qantas unveils 'next generation' checkin for its frequent flyers", http://www.airlinetrends.com/2010/07/26/qantas-next-generation-check-in/, dated Jul. 26, 2010, Publisher: airlinetrends.com.
"Reliable handling and transportation of baggage items", https://www.sew-eurodrive.se/industries/airport_baggage_handling/airport_baggage_handling.html, accessed Dec. 14, 2016, Publisher: SEW EURODRIVE, Published in: SE.
"Self Check-in Copenhagen Airport", https://www.youtube.com/watch?v=97QrlzUByfk, dated Mar. 22, 2009.
"Self Service BagDrop from DSG, Oslo Airport, Norway", https://www.youtube.com/watch?v=Yat-iZ1rfGU, dated Aug. 17, 2015.
"Self-service—the future of baggae processing", http://www.airport-business.com/2012/10/self-service-the-future-of-baggage-processing/, "Airport Business", dated Oct. 12, 2012, Publisher: ACI Europe Airport Business.
Claire Swedberg, "Tagsys, ICM Airport Technics Market RFID Bag Tag to Airlines", http://www.rfidjournal.com/articles/view?8966, "RFID Journal LLC", dated Nov. 16, 2011, Publisher: RFID Journal.
"The Total Airport Solution—TTAS", dated 2016, http://www.fdminc.net/ttas/ttas.htm, Publisher: Flight Data Management, Inc.
"Vietnam Airport—Vietnam Visa on Arrival", http://vietnamvisapro.com/en/news/Qantas2--airport-142.html, dated 2016, Publisher: Vietnam Visa on Arrival, Published in: VN.
"Where do my bags go? Airport baggage system ride along", https://www.youtube.com/watch?v=B6DVakJd_TQ, dated May 25, 2010.

Authorized Officer: MD Reza-E Rabbi, "International Search Report" issued in related PCT application No. PCT/AU2011/000957, dated Aug. 9, 2011.
Authorized Officer: MD Reza-E Rabbi, "Written Opinion" issued in related PCT application No. PCT/AU2011/000957, dated Sep. 7, 2011.
Website http://www.ier.fr/files/DBA-V2-GB-03-2010.pdf, IER2010, 2 Pages, Self-Service Bag Drop Off, Self-service baggage drop off for frequent and occasional travelers.
Website http://web,archive.org/web/20080607093747/http://bagdrop.com/technology, dated Jun. 7, 2008, 2 pages, Retrieved from the Wayback Machine on Feb. 22, 2013, "Bagdrop, Innovative Technology".
Website http://www.bcsgroup.biz/international/media/documents/BCS%20BAGate%20Brouchuerrev.pdf, retrieved on Mar. 25, 2013, 5 pages, "BCS, we are the end to end solution for Bag Drop Systems".
"Non-Final Office Action" issued in related U.S. Appl. No. 13/812,616 dated Aug. 14, 2015.
Website http://www.ier.com/files/IER_Frequencies_25_EN.pdf, Transportation Solutions News, No. 25, First Quarter 2010, 12 pages, "Frequencies IER".
Website http://www/bagdrop.com/technology, retrieved from the Wayback Machine on Oct. 7, 2015, dated Jun. 7, 2008, 2 pages, "Bagdrop, Innovative Technology".
Website http://www.skymark.jp/ja/res_boarding/baggage.html, English translation attached to original, English translation retrieved from the Wayback Machine on Oct. 2, 2015, Original Document retrieved from the Wayback Machine on Sep. 25, 2015, Both Dated Jul. 4, 2010, All together 5 pages, "Skymark Airlines, From reservation to boarding Reservation / Payment Flights / Ait exchange slips Baggage boarding procedure / boarding".
"Final Office Action" issued in related U.S. Appl. No. 13/812,616, dated Dec. 18, 2015.
Kilian (Author), Published by Sick AG, dated Nov. 2009, 36 pages, "Airport baggage identification with RFID and Barcode".
Kilian (Author), Published by Sick AG, dated Aug. 2009, 5M/BU02, 2 pages, "ALIS 400 Self Checkin Systems".
Kilian (Author), Published by Sick AG, dated Sep. 2010, 5M/2, 12 pages, "ALIS Self-Checkin and Self-Bag-Dop".
"Non-Final Office Action" issued in related U.S. Appl. No. 13/812,616, dated Nov. 17, 2016.
"Final Office Action" issued in related U.S. Appl. No. 13/812,616, dated Mar. 20, 2017.
"Supplemental Notice of Allowance" issued in related U.S. Appl. No. 15/119,290, dated Apr. 24, 2017.
"Notice of Allowance" issued in related U.S. Appl. No. 15/119,290, dated Jan. 5, 2017.
"Office Action" issued in related U.S. Appl. No. 15/119,290, dated Jan. 30, 2017.
Authorized Officer: Ericson Salindo, "International Preliminary Report on Patentability" issued in related PCT application No. PCT/AU2015/000114, dated Jun. 27, 2016.
Authorized Officer: Ericson Salindo, "International Search Report" issued in related PCT application No. PCT/AU2015/000114, dated May 7, 2015.
Authorized Officer: Ericson Salindo, "Written Opinion" issued in related PCT application No. PCT/AU2015/000114, dated May 7, 2015.

* cited by examiner

LUGGAGE PROCESSING STATION AND SYSTEM THEREOF

TECHNICAL FIELD

The present invention relates to luggage processing station or device adapted for use with booking, processing and loading of airport luggage throughout an airport and onto an associated airplane. The recent invention may also include a system and/or method as embodied within the said station or device.

BACKGROUND

Previously, there has been a long felt need for a system or device that it is capable of safely and efficiently booking and processing passenger luggage in the airport environment.

A previous system is the BagDrop Standard Unit or system which is disclosed in detail at http://www.bagdrop.com. The BagDrop system is generally bulky and has severe limitations in terms of ease and/or speed of usage which is generally connected with the overall layout of the machine and location of the passenger loading luggage onto the machine.

PCT Published Patent Application No. WO2012012841 describes an earlier disclosed system that includes many improvements in ease of usage over the BagDrop Standard Unit. However, this disclosed system may generally lack adaptive features that allow for bulky passenger items or luggage to be processed. Additionally, the system may be improved with better systems. The disclosed system also has limitations in regard to the processing of airport tubs.

Any discussion of the prior art throughout the specification should in no way be considered as an admission that such prior art is widely known or forms part of common general knowledge in the field.

SUMMARY

Problems to be Solved

Many earlier attempts have had issues in relation to airport security or passenger safety and it is an object of the present invention to at least address or ameliorate some of the issues. It is also an aim or objective of the present invention to provide an improved processing, system and/or method for processing luggage wherein reliability, convenience, and/or ease of usage is at least addressed or improved.

It is an object of the present invention to overcome or ameliorate at least one of the disadvantages of the prior art, or to provide a useful alternative.

Means for Solving the Problem

A first aspect of the present invention may relate to a processing station for registering a piece of passenger's luggage for a trip, wherein the processing station comprises an injector for receiving the piece of luggage associated with the passenger; at least one sensor associated with the injector, the at least one sensor, in combination with at least the floor of the injector, creating a zone around the piece of luggage; and a controller associated with the sensor being adapted to: monitor, via the at least one sensor, intrusions through the zone to determine one or more whether a predetermined limit on dimensions of the piece of luggage has been exceeded or whether a foreign object has intruded the zone from outside, and allow further processing of the piece of luggage only if no intrusion of the zone is detected; and wherein the controller adjusts the area of the zone to accommodate different sizes of luggage.

Preferably, the zone may encompass the piece of luggage at a distance of between 1 mm to 1 m from an outer perimeter of the piece of luggage.

Preferably, wherein the first aspect includes one or more cameras as the at least one sensor, and further the cameras may be stereotypic cameras or infrared spectrum cameras.

Preferably, the first aspect of the present invention may also include three or more sensors and may also include at least one barcode reader.

Preferably, the first aspect of the present invention may include the injector wherein the injector includes no physical walls except for the floor; or alternately wherein the injector includes a physical front wall, physical side wall, and a physical floor.

Preferably, the zone may include concave or convex walls or walls that taper towards the centre of the injector.

Preferably, wherein the sensors include cameras, the cameras may be directed towards the centre of the injector, when in use.

Preferably, wherein the zone includes a virtual top wall which is generally parallel to a floor of the injector when the height of the virtual top is below a minimum threshold.

A second aspect of the present invention may include: a processing station for registering a passenger's luggage for a trip, wherein the processing station comprises: a luggage transportation tub having a first shape, the tub being adapted to receive the piece of luggage associated with the passenger, an injector for receiving the tub with the piece of luggage therein; at least one camera associated with the injector, wherein the at least one camera is positioned so as to allow an image of the tub to be taken; and a controller associated with the camera, the controller being adapted to control the operation of the at least one camera and wherein the controller compares the image to a database of predetermined tub shapes.

Preferably, wherein the controller confirms with the passenger the use of the tub. Also preferably, the controller may measure the combined weight of the luggage and tub and then subtracts the weight of the tub from the combined weight and records the result with the passenger's flight details.

Please note that the definition of the "centre of the injector" is intended to include the hypothetical centre or locations proximal to; and/or the equivalent point of the approximate centre of the floor or any approximate point rising from the centre of the floor of the injector.

In the context of the present invention, the words "comprise", "comprising" and the like are to be construed in their inclusive, as opposed to their exclusive, sense, that is in the sense of "including, but not limited to".

In the context of the present invention, the word "tub" may refer to or be construed as any tub suitable for use as a portable luggage receptacle in an airport environment. Typically, tubs include within their meaning a five shaped tray or cup shaped receptacle with a flat bottom forming a general rectangular shape when viewed from a top view. Generally, tubs are constructed of light weight and relatively rigid material and generally are constructed of plastics or polymers including polypropylene.

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Figure 1:
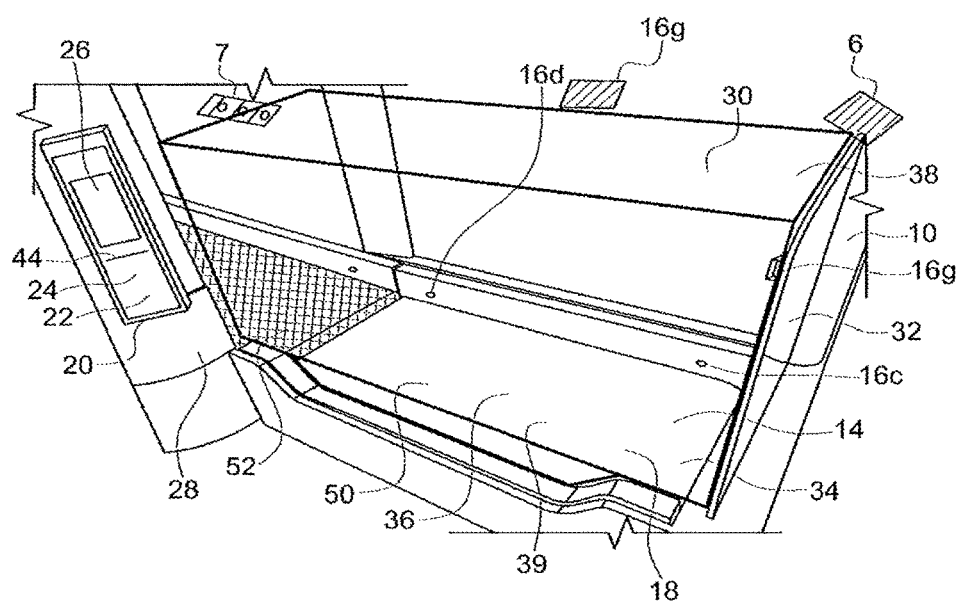
FIG. 1 depicts a front perspective view of the first preferred embodiment of the present invention.
Figure 2:
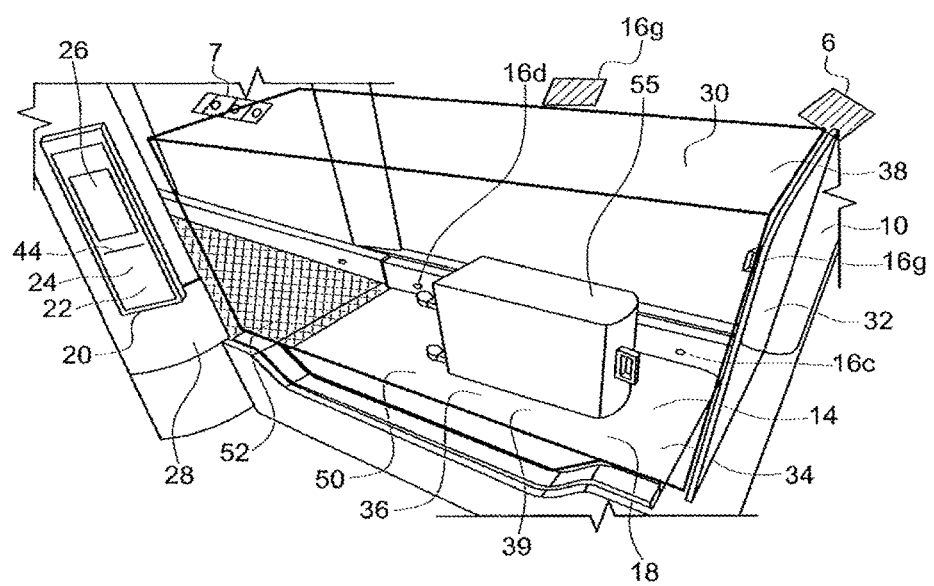
FIG. 2 depicts a front perspective view of the first preferred embodiment wherein a piece of luggage has been loaded into the injector.
Figure 3:
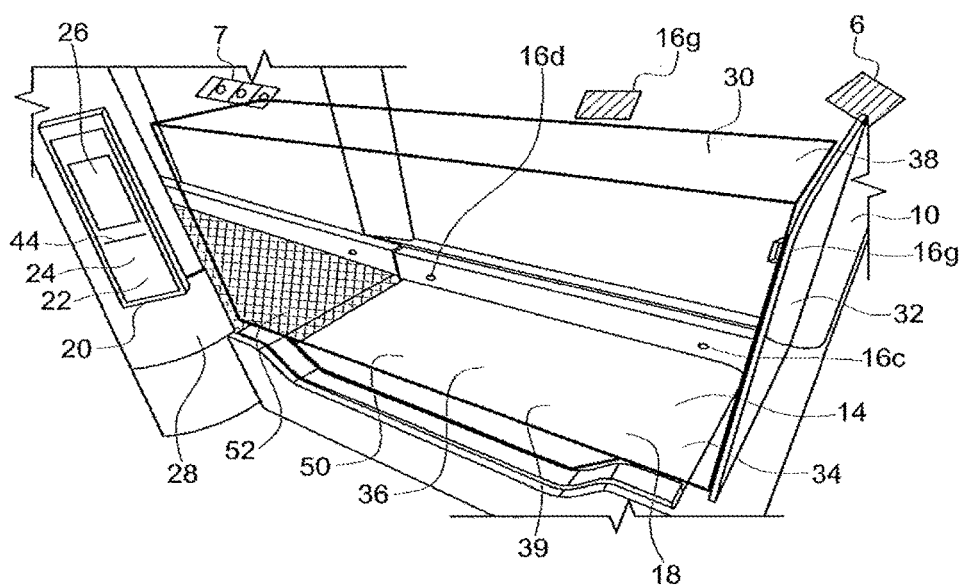
FIG. 3 depicts a front perspective view of a second preferred embodiment of the present invention.

Preferred embodiments of the invention will now be described with reference to the accompanying drawings and non-limiting examples.

The first preferred embodiment of the present invention includes a luggage process station or device that is adapted to receive luggage from a passenger. The station is adapted to safely receive the luggage and to then process the luggage. Preferably, processing the luggage may involve a multiple stage process which will be described in greater detail within this document. Preferably, the luggage processing station may include a processing area for receiving a piece of luggage Referring to the drawings, there is provided a processing station 10 for registering a passenger's luggage for a trip. The processing station 10 comprises an injector 14 for receiving a piece of luggage associated with the passenger. A plurality of or multiple sensors 6-7 are associated with the injector. The sensors 6-7 are described in detail below. A weighing machine 18 is also associated with the injector 14 for weighing the piece of luggage whilst on a bottom or lower surface of the injector 14. The luggage processing station also comprises a user interface 20 for receiving various inputs for confirming that a passenger has checked-in. For example, the user interface 20 includes an electronic card reader, in the form of an RFID card scanner 22, for reading an electronic identifier from an electronic RFID-enabled passenger identification card to confirm passenger check-in. Alternatively, or in addition, the scanner 22 may be adapted to read an electronic identifier stored on an electronic device, such as a passenger's mobile phone, and transmitted to the scanner using near-field RFID to confirm passenger check-in; or barcodes or QR codes may be used.

Preferably, the user interface also includes a scanner 24 for scanning various types of passenger boarding passes, such as paper boarding passes with magnetic strips and printed boarding passes with one dimensional (1D) barcodes. The user interface 20 may further include a magnetic card scanner for scanning magnetic strip-type passenger identification cards.

The user interface comprises a touch screen display 26 to display information to the passenger during processing of the piece of luggage. The screen 26 is adapted to display a message directing the passenger to remove their luggage and check-in prior to attempting to process their luggage if the input indicates that the passenger has not checked-in, the screen 26 also permits the passenger to input information to facilitate processing of the piece of luggage.

A controller 28 is associated with the sensors and weighing machine 18 and the user interface 20. The controller 28 is adapted to accept the piece of luggage if the input received via the passenger's boarding pass or identification card indicate that the passenger has checked-in for the trip, feedback from the sensors 6-7 indicates that predetermined criteria, which are discussed in more detail below, are met, and if feedback from the weighing machine 18 indicates that weight of the piece of luggage is within a predetermined limit.

Preferably, the sensors 16a, 16b, (please note that sensors 16a and 16b are not visible in the perspective views shown in FIGS. 1-5, as there are positioned on the opposed respective inner side on injector proximal to the access opening) 16c and 16d, in combination with walls 30, 32 and a floor 34 of the injector 14, create a six-sided virtual box around a loaded piece of luggage. Sidewall 36 and top 38 of the virtual box are generated by the combination of sensors, respectively, such that no physical barrier is provided on these sides of the injector 14, and thereby define a side access opening 39 to the injector 14 to facilitate a passenger side loading luggage into the injector 14 from a position adjacent the user interface 20. The combination of sensors facilitate determination of whether the height and width of the loaded piece of luggage are within predetermined limits for acceptance. Sensors 16c and 16d (in cooperation with 16a and 16b respectively) include photo eyes for facilitating positioning of the piece of luggage in the injector 14 and determining whether the length of the piece of luggage is within predetermined limits for acceptance. However, in alternate embodiments, 3D imaging using cameras may be used to detect the length and width of the piece of luggage.

Physical walls 30 and 32 comprise a vertical glass panel to prevent unauthorised access to the piece of loaded luggage, whilst still allowing the piece of loaded luggage to be viewed. The initial height and width dimensions of the virtual box may be adjusted by a suitably authorised technician, for example to conform the luggage processing station to the regulatory standards on luggage dimensions for a particular airport.

The controller 28 is adapted to monitor, via sensors, intrusions through the virtual box to determine whether a foreign object has intruded the virtual box from outside, which may indicate that the piece of luggage has been tampered with, and allow further processing of the piece of luggage only if no intrusion of the virtual box is detected. The controller 28 is also adapted to monitor, via sensors 6-7, whether the dimensions of the piece of luggage are within the predetermined limits applicable to the particular airport, and allow further processing of the piece of luggage only if the predetermined limits are determined not to have been exceeded. The controller 28 is also adapted to monitor, via sensors 16c and 16d, whether the piece of luggage is correctly positioned in the injector 14 and allow further processing of the piece of luggage only if this is the case. If the piece of luggage is determined to be oversized, the controller 28 causes the screen 26 to display a message for the passenger to remove the piece of luggage and proceed with same to an oversize luggage processing counter. If the piece of luggage is determined to be overweight, the controller 28 may cause the screen 26 to display a message offering for the passenger to repack the piece of luggage to reduce its weight. If the piece of luggage is accepted for further processing, the controller 28 causes the piece of luggage to be weighed via the weighing machine 18. If the virtual box is breached after weighing of the piece of luggage is complete, the controller 28 is adapted to provide the passenger with a message indicating same via the user interface 20 or the screen 26. Once the breach of the virtual box is rectified, the controller 28 is adapted to cause the piece of luggage to be re-weighed. If the virtual box continues to be breached by the piece of luggage, the controller 28 causes the screen 26 to display a message for the passenger to remove the piece of luggage and proceed with same to an oversize luggage processing counter.

The sensor 6-7 may also function as a user detection sensor to detect the presence of a user in a predetermined zone around the processing station 10. The predetermined zone extends over an area around the user interface 20 and the access opening 39 to the injector 14. The controller 28 is adapted to terminate processing of a piece of luggage if feedback from the sensor 16b indicates that the user has moved out of the predetermined zone prior to acceptance of the piece of luggage.

The luggage processing station 10 comprises detectors, comprising bar code scanners 16g, for detecting whether the piece of luggage has a bag tag applied that stores information for associating the piece of luggage with the passenger and the passenger's trip. Preferably, there are at least two bar code readers, wherein the first is mounted directly above the luggage and the second is mounted midway along the front wall. More preferably, the system may include 3 or 4 multi axis bar code readers mounted around the perpheri of the injector to visualise the piece of luggage from multiple angles. The controller 28 is responsive to the detectors and is adapted to reject the piece of luggage if the detectors cannot detect the presence of a bag tag storing the required information. The trip information on the bag tag may comprise information for associating the passenger's luggage with a vehicle carrying the passenger on the trip, such as an aircraft IATA license plate. Preferably, the trip information may include any or all of the following: IATA license plate numbers, flight date, trip information, flight number, destination, passenger names. Preferably, a printed bag tag may be issued by the printer 44 in this embodiment or a separate kiosk electronically linked to the embodiment may be able to process and print the appropriate bag tag.

Please note that in some further embodiments, the sensors 6-7 may be formed by the use of cameras acting as the sensor and in these situations, at least one camera may operate as a bar code reader and in turn supply information to the controller.

The bag tag may be in the formed of a printed tag with a barcode or alternately a RFID tag may be used; or a combination of the two methodologies.

Preferably, the user interface includes a printer 44 for printing a luggage receipt for accepted luggage with an electronic bag tag. The tag may alternatively be a barcoded tag, such as a 1D or 2D barcode paper tag, readable by barcode scanners 16g. The barcode scanners 16g are movable and are located above the floor 34 of the injector so as to have line of sight with the piece of luggage on the inner surface of the injector 14. The barcode scanners 16g are also programmed to ignore barcodes sensed outside a predetermined zone that is established based on x, y and z coordinates from the barcode scanners 16g. This reduces the risk of the barcode scanners 16g reading barcodes not associated with the piece of luggage in the injector 14.

The controller 28 is adapted to reject the piece of luggage if the weighing machine 18 indicates that the piece of luggage exceeds a predetermined weight and is thereby classified as heavy, but is still less than a maximum allowable weight. In such cases, the controller 28 is adapted to send a message indicating same to the passenger via the screen 26. Where the passenger has not exceeded their maximum luggage weight allowance, the message instructs the passenger to apply a heavy tag to the piece of luggage. To facilitate same, the controller 28 may cause a colour-coded, RFID, barcoded print out or a heavy tag to be dispensed by a heavy tag dispenser (not shown) associated with the injector 14 for application to the piece of luggage. Preferably, a colour coded RFID tag or a barcoded heavy tag may be attached to the piece of luggage and the embodiment confirms the presence of the heavy tag before accepting the piece of luggage for registration into the system.

Sequential coding of tags is also used to facilitate monitoring of stock levels of tags in the processing station 10. If the sequential coding indicates that tag stock levels are below a predetermined level, the controller 28 is adapted to cause a message to be transmitted, for example by a beacon, SMS or paging, to alert staff to restock the tags.

The dispensed heavy tag may alternatively take the form of a printed tag including visual indicia and/or a barcode for indicating weight data for the piece of luggage.

If the piece of luggage is determined to exceed the maximum allowable weight, which may be based on a limit set for occupational health and safety reasons, then the controller 28 may reject the piece of luggage and cause a message to be sent to the passenger, via the screen 26, informing the passenger of same and offering for the passenger to repack the piece of luggage to reduce its weight. The maximum luggage weight allowance for the passenger may be affected by the payload capacity of the aircraft carrying the passenger on the trip and/or the passenger's status with the airline associated with the trip. The controller may be adapted to cause weight information associated with the piece of luggage to be sent to a flight management system for aircraft weight and trip purposes.

In some embodiments, a dispenser may be provided for dispensing paper tags for classifying the piece of luggage as being a priority piece of luggage, a piece of luggage with special handling requirements, and/or a piece of luggage of a special class. The controller 28 is also adapted to reject the piece of luggage if a passenger has reached the maximum number of pieces of luggage in their luggage allowance or their maximum luggage weight allowance. In such cases, the controller 28 is adapted to send a message indicating same to the passenger via the screen 26. The message provides the passenger with options for rectifying the breach of their luggage entitlement, such as repacking their luggage to reduce weight or paying a surcharge. If the passenger elects to repack their luggage, the controller 28 causes the weighing machine 18 to re-weigh the luggage upon the passenger indicating via the touch screen 26 that the bags have been repacked and once the virtual box is detected to be intact.

Alternatively, the passenger may elect to pay a surcharge to increase their luggage entitlement. Once rectification action has been taken by the passenger, the controller 28 checks again if the luggage is now within the passenger's entitlement and, if so, accepts the piece of luggage and causes the printer 44 to print a luggage receipt and/or an excess luggage receipt or excess luggage advice slip. Alternatively, as discussed above, where the passenger has a compatible electronic bag tag, the controller 28 causes one of the RFID antennas to write to the electronic bag tag the data associating the piece of luggage with the passenger and the trip or vehicle on which the passenger is booked to travel. One of the antennas may also be adapted to write to the electronic bag tag information classifying the piece of luggage as being a priority piece of luggage, a piece of luggage with special handling requirements, and/or a piece of luggage of a special class. An injector conveyor 50 is provided in the floor of the injector 14. The weighing machine 18 is located below the injector conveyor 50 and has a recess therein for housing one or more antennae, with a top surface of the antenna 16f being flush with the underside of the conveyor 50 when in position in the recess. The other RFID antennas are located above the floor of the conveyor 50. The controller 28 is adapted to actuate the conveyor 50 if feedback from the sensors 16c, 16d indicates that the piece of luggage is not within a predetermined zone of the injector 14, this zone being a zone within which the piece of luggage can be weighed by the weighing machine, have its maximum length checked by the sensors 16c, 16d, or other sensors (including Microsoft Kinect™ style camera based sensors) and have any bag tags thereon read by the RFID antennas and/or barcode scanners 16g. The controller 28 is also adapted to actuate the conveyor 50 if none of the RFID antennas and/or the barcode scanners 16g is able to communicate with a bag tag on the piece of luggage. In such a case, the conveyor is first moved by a distance of approximately 100 mm and communication with the bag tag is attempted again. If communication with the bag tag is still not possible, the conveyor is moved by a further distance of approximately 100 mm and communication is attempted again. If communication with the bag tag still fails after a predetermined number of movements of the conveyor 50 (more preferably three movements), the controller 28 may be adapted to transmit a message to the display screen 26 instructing the passenger to manually reposition the piece of luggage and/or bag tags, and/or to terminate processing of the piece of luggage.

Once a piece of luggage has been accepted, the controller 28 actuates the injector conveyor 50 to convey the piece of luggage to a downstream collector conveyor system 52. The conveyor 50 may be actuated by a variable speed drive that runs at a lower speed during movement of the conveyor 50 by approximately 100 mm increments than during movement of the conveyor 50 to convey a piece of luggage to the downstream collector conveyor system 52. The controller 50 may be adapted to actuate the conveyor 50 to move the piece of luggage in an abrupt manner when moving by the 1 mm to 10 cm increments but most preferably 100 mm increments to facilitate reorientation of the RFID tag. Preferably, the controller may jiggle the luggage using the conveyor 50 to move the machine readable tags on the luggage into an orientation that may be read to the top mounted barcode reader or front mounted barcode reader.

Preferably, the injector conveyor 50 is oriented so that it is generally parallel with the ground to prevent the luggage from toppling off the said conveyor. The injector conveyor preferably includes an additional rubberised grip in the form of parallel lines or grooves running in a lateral direction along the length of the conveyor 50. In the downstream conveyor 52, the conveyor may be elevated at a distal end away from the passenger leading to a small incline of the downstream conveyor of less than 15 degrees. The downstream conveyor 52 may include a conveyor surface with a diamond shaped grip pattern to improve grip and restriction forces engaging the luggage for movement. Typically, the downstream conveyor may be operated at a higher speed than the injector conveyor 50 for primarily safety reasons as the passenger generally comes into contact with the injector conveyor belt only.

In some embodiments, the controller 28 is adapted to deactivate the conveyor if an intrusion through the virtual box is detected via sensors 6-7 during processing of a piece of luggage in the injector 14. The controller 28 may also be adapted to close landside to airside barriers if an intrusion through the virtual box is detected and preferably this may occur when the light curtains or appropriate sensors above the downstream conveyor 52 detect an intrusion.

The controller 28 may further be adapted to cause a notification, such as triggering of a security alarm, to be sent to a security system or security personnel if an intrusion through the virtual box from outside by a foreign object is detected. The controller 28 may be adapted to allow processing of the piece of luggage to continue or to be restarted if a predetermined security code is input and/or if electronic identification meeting predetermined criteria is provided. The predetermined security code may be input via an Airline Security Identification Card (ASIC). The controller 28 may be adapted to allow manual processing of the piece of luggage via the processing station 10 to continue if the predetermined security code is input. The controller 28 may be adapted to allow manual actuation of the injector conveyor 50 in a forward or reverse direction if the predetermined security code is input to send luggage to the downstream collector conveyor system 52 or return a piece of luggage from downstream. The controller 28 may be adapted to permit deactivation of a security alarm if the predetermined security code is input. The controller 28 may be adapted to permit different levels of access to the luggage processing station 10 depending on the predetermined security code that is input.

Monitoring devices may be provided around the injector 14 to detect when luggage is placed on the bottom surface of the injector 14 as well as intrusion during processing of the piece of luggage and delivery of the piece of luggage to the downstream collector conveyor system. The monitoring devices may comprise one or more of lasers, photo eyes 16c and 16d and light curtains 16i.

The user interface 20 may be adapted to require the passenger to answer questions about the configuration of their luggage. If the passenger's answers indicate that the luggage may cause problems with downstream luggage handling apparatus, for example due to having straps or being unusually configured, the luggage may be classified as an awkward bag and the user interface 20 may be adapted to instruct the passenger to place the luggage into a luggage transportation tub (not shown) and to place the tub (not shown) with the luggage therein in the injector 14. In other embodiments of the present invention, this verification process step may be achieved automatically by the system without further user interaction.

The luggage transportation tub (not shown) may be embedded with an electronic RFID tag that is integrally connected to the tub (not shown), for example by being moulded into the tub (not shown). The controller 28 is adapted to only allow the awkward shaped or irregular shaped luggage to be processed if feedback from the RFID) antennas indicates that the luggage is in a tub (not shown). When a piece of luggage in a tub (not shown) is detected, the controller 28 is adapted to automatically deduct the weight of the tub (not shown) from the weight measured by the weighing machine 18 to determine the actual weight of the piece of luggage.

Preferably, the tub with the RFID tags may be replaced with a tub without RFID tags wherein the sensors 6-7 are constructed of cameras and the controller 28 includes 3D pattern recognition software. Preferably, the controller may be able to detect the use of the tub from pattern recognition software that compares the presented tub with a databases of tubs commonly used in the airport within which the station is installed. This may allow the system to automatically detect the use of a standard luggage tub as used within airport facilities.

Preferably, wherein a tub is detected as being used by a passenger, the controller may automatically detect the weight of tubs from the combined weight of the tub with luggage. The result is recorded with passenger flight information. The controller may also use the passenger interface to confirm the use of the airport tub.

One or more cameras may also be positioned around the injector to record images of luggage accepted. The cameras, or other image capturing devices, may also be used to detect the location of intrusions through the virtual box or virtual zone. Weight specific logic associated with the controller 28 and governing its relationship with the weighing machine 18 is separated from other code associated with the controller 28. The weight specific logic is maintained in a first module having a unique version number and the other code is maintained in a separate module or modules having a unique version number of numbers that is distinct from the version number of the module in which the weight specific logic is maintained. In this manner, changes to non-weight related aspects of the code/logic associated with the controller 28 do not require recertification of the processing station 10 as a weighing device. The weighing device is adapted to automatically recalibrate itself to zero weight after acceptance of a piece of luggage and before weighing a new piece of luggage.

The processing station 10 is adapted to store a history of accepted luggage to facilitate investigations. The controller 28 may be adapted to allow the history to be accessed or printed if a user provides a predetermined security code. The security code may be provided in a number of formats, as discussed above with respect to overriding of security alarms.

It will be appreciated that the above described and illustrated processing station 10 provides many advantages over conventional passenger luggage handling systems, some of which are discussed above, but which additionally include: providing for luggage processing and injection only at the processing station 10, which largely mitigates queues; providing enhanced security and safety checks to detect incidence of luggage tampering; providing the ability to write information, such as flight and weight information, to electronic bag tags; speeding up the process of checking in luggage for a flight; facilitates passenger self-service; and facilitates the passenger staying within the predetermined zone covered by sensor 6-7 during loading and processing of the piece of luggage due to the orientation of the access opening 39 transverse to the axis of the conveyor 50, in combination with the positioning of walls 32 and 34 and with the positioning of the user interface 20 on the same side of the conveyor 50 as the access opening 39; reducing the risk of reading from and/or writing to RFID tags not associated with a piece of luggage in the injector by housing the RFID antenna (not shown) in a recess underneath or within the conveyor 50; increasing the incidence of non-communication between tags and the RFID antennas and/or barcode scanners 16g by automatically adjusting the position of the piece of luggage using the conveyor 50 if communication cannot be established; accepting multiple boarding pass types; accepting multiple bag tag devices; luggage acceptance area monitored with lasers, photo eyes and light curtains to detect when baggage is placed in the area as well as intrusion during the acceptance process; weighing and measurement of luggage in the baggage acceptance area; an interactive user interface; printers embedded to print out excess baggage receipts and heavy tags embedded with RFID to ensure the tag is attached when a bag is heavy; tubs embedded with RFID are used for awkward bags so that they can be detected when used; and use of cameras to record images of bags accepted.

Preferably, in these embodiments the controller may form an artificial three dimensional zone around the piece of luggage 55. This artificial three dimensional zone may be in the form of a virtual box as shown in FIGS. 1 to 4 and it preferably seals the area designated by the zone from third party intrusion into the zone (or sometimes referred to as field). In these embodiments, the zone is also described as a dynamic virtual box or shape. The dynamic virtual shape is preferably formed around or about a piece of luggage to be processed. Preferably, the zone may be modified in terms of shape to closely approximate the general shape of the luggage 55. The closer the zone approximates the shape the luggage, the more reliable the system is against accidental intrusion into the zone. For example, a passenger may have loaded a piece of luggage onto the injector, whilst the passenger is also carrying a handbag with swinging straps, sometimes the swinging straps may swing over the injector. It is an advantage of the current embodiments that the controller will not react to a swinging handbag strap that does not enter the zone. This leads to better passenger experience and less wastage of time by false intrusions which may occur with other similar systems.

Preferably, the dynamic virtual shape or zone may be adjusted or modified in terms of shape or dimensions to fit the piece of luggage inserted into the injector. The dynamic virtual zone is preferably adapted to provide a secure field around the piece of luggage and to prevent intrusion of the field by the user or foreign object. Preferably, the zone surrounds or encompasses the piece of luggage at a distance of between 1 mm to 1 m from the outer perimeter of the piece of luggage.

Dynamic Virtual Box or Zone

Preferably in the preferred embodiments of the present invention, the dynamic virtual box wall and ceiling may be initially set at pre-set values and may be configured at the build and commission stage of station installation. Therefore the preferred sensor height setting may preferably be set to approximately 900 mm due to restrictions on design, which is far more than the height of most bags. The virtual box outline can be seen in FIGS. 1 to 5. The height and locations of the sensor walls may be dynamically altered to match the piece of luggage which is positioned within the injector by a process within the embodied system or device.

If a user then places a bag on the belt, even after the first initial scan of the bag, the laser sensor determined or LMS intrusion height preferably would not change. This therefore may allow that the occurrence of passengers, who accidentally and unintentionally intrude due to leaning on the front glass panel, or swinging their hand luggage into the interference zone, can be quite high.

It is generally noted that other shapes other than boxes may be used to achieve a similar result or function including spheres. Additionally, it is noted that the station and system may be improved by extending the zones to other shapes rather than solely box shapes. Preferably, the dynamic virtual zone may include side walls or top walls that are deflected in a convex or concave manner to accommodate similarly shaped bags and/or luggage. Preferably, the controller includes a pattern recognition algorithm and may determine whether the piece of luggage is irregularly shaped and may bend the walls of the zone accordingly.

The virtual zone system may be modified to be dynamic using the Microsoft Kinect™ 3D camera systems or arrays instead of relying on the fixed laser sensing devices. The default max height may be reduced to 750 mm (or another value if required). Please note that other stereotypic camera systems may also be used, but the preferred systems include an array of at least two cameras to provide a three dimensional image via stereotypically linking the cameras. Preferably, the cameras or camera arrays may be mounted on motorised mounts to allow for rotation, if required. Additionally, the cameras may be positioned near or proximal to the upper limit of the virtual zone and may be oriented at an angle towards the centre of the injector wherein the luggage is received. Additionally, the preferred sensors or cameras may be adapted to operate in the infrared frequency so that they are either: not visible to passengers and to reduce noise based interference; or less susceptible to light fluctuations in the airport facility within which they are positioned.

Preferably, the injector may be configured to include one camera array mounted on the top front of the injector and two camera arrays mounted in a tunnel over the downstream conveyor 52, wherein the two camera arrays are directed towards the area wherein the luggage is received.

With the Dynamic Virtual zone, upon placing a bag on the belt and the initial three dimensional (3D) scan being completed, the side and height measurements will be changed to suit the dimensions of the bag. This will therefore be slightly higher than the bag placed on the conveyor and is worked out using complex 3D mathematical algorithms. The virtual ceiling will also taper off towards the front glass panel to reduce the chance of unintended intrusions where a passenger may be leaning over the panel (see FIG. 5 in regard the top wall 61).

Figure 4:
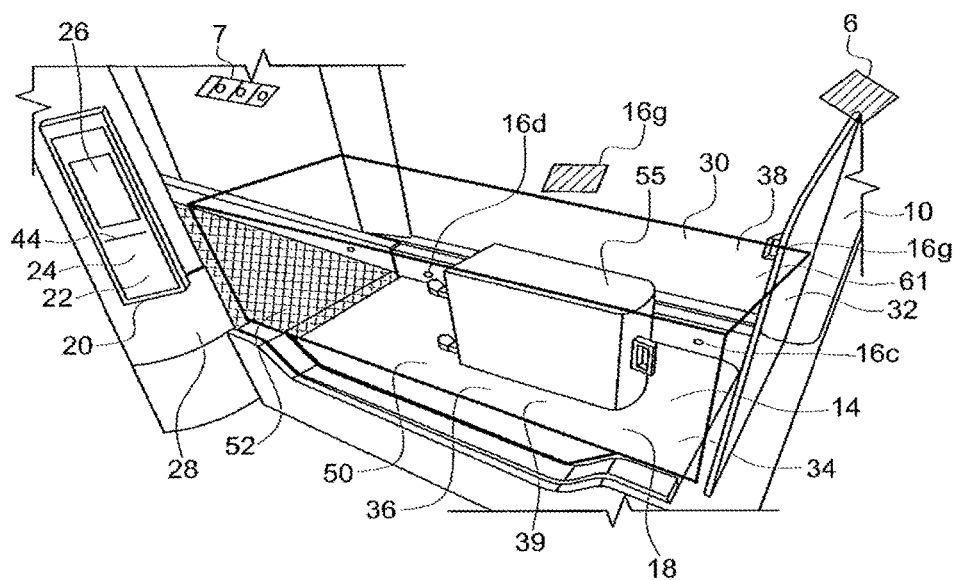
FIG. 4 depicts a front perspective view of the second preferred embodiment wherein a piece of luggage has been loaded into the injector.
Figure 5:
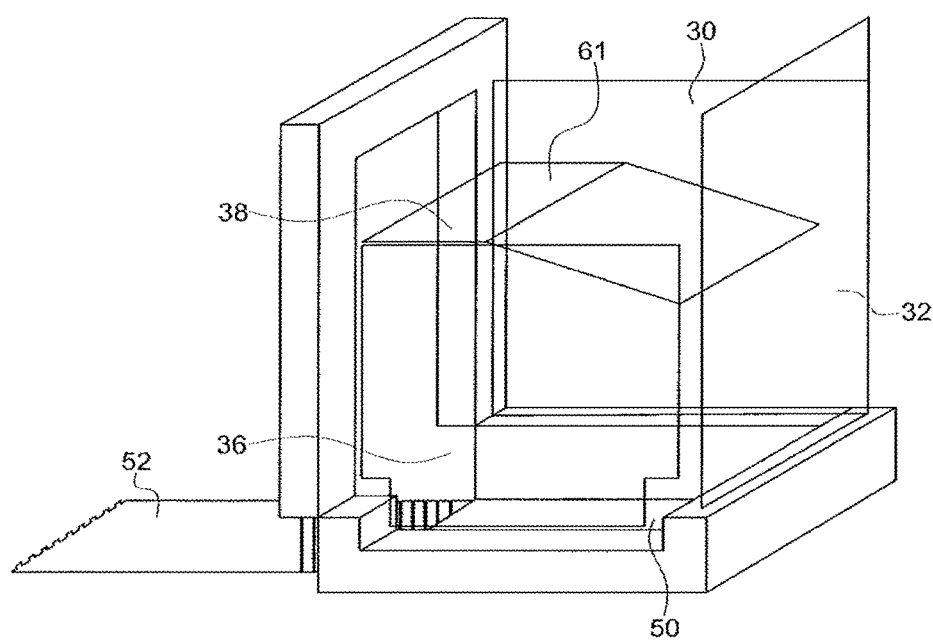
FIG. 5 depicts a left side perspective view of a third preferred embodiment of the present invention.

If a passenger does intrude after the dynamic virtual box has been set, the default size virtual box (750 mm height) will be temporarily used until the post-intrusion scan has been completed (in order for the dynamic virtual box to be re-calculated). This allows for dynamic adjustment of the virtual box due to a changed bag position or the placement of a different bag onto the belt. The image depicted in FIGS. 4 and 5 show the 'dynamic' virtual box adjusted to suit the size of the bag or piece of luggage on the scale conveyor.

In this specification, the laser sensing Module is also referred to as 'Intrusion Processing Module' or 'Intrusion Detection Processing Module'.

Generally, an Intrusion Processing Module consisting of one or more depth image sensors, but preferably 3 sensors. The sensors may be light curtains, stereotypic cameras including but not limited to Microsoft Kinect™ devices, photo eyes. At least one default depth image sensor that has adequate field of vision of the injector. The Intrusion Processing Module is connected to a controller which may be able to allow or limit movement on the injector conveyor 50 and dispatch/downstream conveyor 52.

In one embodiment, the default depth image sensor creates a virtual zone consisting of a relatively vertical curtain between the user and the scale conveyor and a relatively horizontal curtain above the scale conveyor. Should an intrusion occur in either of these regions, the controller will restrict or immediately stop the injector conveyor 50 and dispatch or downstream conveyor 52 will cease moving. The controller will also stop the luggage from being processed for check in.

The Intrusion Processing Module is able to dynamically adjust the virtual box, surrounding the check in luggage, based on the dimensions of the passenger luggage being checked in. This will result in an optimal intrusion region, similar in height to the height of the passenger luggage, thereby, for the most part, reducing unwanted accidental intrusions due to either limbs, handbags, carry-on bags etc. entering the virtual zone.

Preferably, a luggage processing station preferably for use in processing luggage at an airport, wherein the station may include: at least one depth image sensor, (the default depth image sensor) that has adequate field of vision of the injector. That is: The depth image sensor shall have the entire scale conveyor in its field of vision, i.e. beginning at the end stop (which is preferably determined by the position of sensor 16c) and ending with the down-stream conveyor 52, the depth image sensor shall have the entire sidebar in its field of vision, the depth image sensor shall have the maximum permissible bag height in its field of vision for the entire length of the scale conveyor, no point in either the side or top region of the virtual zone must be further than 3 m from the depth image sensor.

The station may also include a real time communication module to operate between the 3D Scanner or camera (any one or more of sensors 6-7) and the Intrusion Processing Module. The Intrusion Processing Module requires an up to date and accurate calibration file, for each depth image sensor relevant to the preferred injector.

If any depth image sensor's orientation is moved, the 3DScanner will be required to recalibrate before the Intrusion Processing Module can again be declared reliable.

After each scan, the Intrusion Processing Module will require the luggage height in order to dynamically re-locate the virtual zone surrounding the piece of luggage.

At least one depth image sensor, (the default depth image sensor) that has adequate field of vision of the injector is able, in conjunction with the walls 30 & 32 and floor 14 of the injector, to create a virtual zone around the piece of luggage, by constructing a virtual side curtain 36 and virtual top curtain 38. The processing module associated with the default depth image sensor will monitor any intrusions through the virtual zone, to determine one or more of whether a predetermined limit on dimensions of the piece of luggage has been exceeded or whether a foreign object has intruded the virtual zone from outside, and allow further processing of the piece of luggage only if no intrusion of the virtual zone is detected.

As part of its initialization routine, the Intrusion Processing Module will define a default virtual side curtain and virtual top curtain to form the initial virtual zone. The Intrusion Processing Module will also define multiple virtual zones with a predefined minimum and maximum height at a predefined interval or step size.

The word "virtual box" or "virtual zone" throughout this specification is to be understood as meaning a zone that is wholly or in part comprised of a non-physical barrier. The virtual zone consists of a three dimensional area that encompasses a piece of luggage and is generated by preferably two or more of the depth image sensors. Preferably, the virtual zone may encompass the piece of luggage wherein the floor forms one side of the zone and the remainder of the zone is determined by physical barriers and virtual walls generated by sensors. In some embodiments, the physical barriers (as shown in FIGS. 1-4 as walls 30 & 32) may be omitted and replaced with virtual walls.

The dimensions of the virtual zone or box may be adjusted to conform to the respective regulatory standards on luggage dimensions for a particular airport.

Both the virtual side and top curtain will have a predefined thickness, which will result in a defined minimum and maximum depth intrusion region, whereby any part of any object found to fall within this depth region will be analysed to determine whether it is a positive intrusion or not. To prevent accidental intrusions, it is generally required that the intrusion to be persistent over a predefined period of time (preferably in a range of 1 ms-2 sec but most preferably 100 ms). This feature may prevent accidental intrusions and to eliminate noise.

Preferably, the intrusion size should be required by the system to exceed a predefined minimum threshold in order for the intrusion to be considered as valid (e.g. 1-100 mm).

Depth frames are processed by the Intrusion Processing Module at a sampling frequency of 30 Hz. However other frequency ranges are possible.

In most implementations, the depth image sensor is situated above the maximum permissible bag height, and therefore is tilted downwards, in order to be able to fully image the injector conveyor 50. Therefore, in order to maximise the viewing area of the depth image sensors, the Intrusion Processing Module can be configured so that the virtual top curtain 61 may not be flat (as shown in FIG. 5), but tapers downwards, as the injector conveyor 50 approaches the downstream conveyor 52. This is to counteract the depth image sensor's limitations on its field of view; so that the entire virtual top curtain remains within the depth image sensor's field of view.

The virtual side curtain 61 has a varying lower height in order to accurately track the side guard's height (see FIG. 4). This can be calibrated to within a few millimeters (preferably between 1 mm to tem) so that no piece of luggage or any other object is able to intrude, undetected, in the gap between the side guard and the bottom of the side virtual curtain.

In some of the implementations or embodiments, it may be possible that more than one depth image sensor is used on the same system for other purposes (other than creating a virtual box). When the other scanning functions are performed by other sensors mounted around the station.

Preferably, the station may include one or more sensors but in the preferred embodiments, the station may include three sensor arrays and two bar code readers.

After each scan the 3D Scanner (e.g. in this embodiment this sensor is shown as sensors 6-7) will convey to the Intrusion Processing Module, the height of the current piece of luggage. Using the sum of the luggage height and a predefined safety margin, the Intrusion Processing Module will update the virtual side and top curtain with one of the multiple virtual boxes (comprising the dynamic virtual zone). The criteria in choosing the height of the dynamic virtual zone is that it is as close to the luggage height as possible, but that it lies above the sum of the luggage height and the predefined safety margin. Preferably, the zone is amended and modified between the insertion of different pieces of luggage into the injector.

The virtual side curtains or walls contained within the multiple virtual boxes or zones, accurately track the lowered virtual top curtains, so that both the side and top curtain have the same height.

Preferably, lower virtual zones (in terms of height) may comprise of virtual top walls that are generally flat or level or generally parallel to the floor of the injector; as the virtual boxes increase in height past a minimum threshold, the virtual top curtain or wall may begin to taper towards the centre of the injector where the injector conveyor approaches the downstream conveyor to counteract the depth image sensor's limitations on its field of view.

Preferably, in some embodiments of the present inventions, all virtual side curtains or walls may be contained within the multiple virtual boxes or zones accurately track the sidebar height.

At a predefined rate of approximately 30 Hz, a data packet is sent to the controller with all the necessary information generated by the Intrusion Processing Module. This information includes: whether there is currently a valid intrusion in the virtual side curtain, whether there is currently a valid intrusion in the virtual top curtain, and whether the virtual side curtain is adequately visible to the depth image sensor, whether the virtual top curtain is adequately visible to the depth image sensor.

It may also be preferred, wherein a data packet is sent from the Intrusion Processing Module to the controller, as soon as each depth image received by the depth image sensor has been received and checked for intrusions. Each data packet acts as a heartbeat to the controller, to indicate the Intrusion Processing Module is alive and well. If the controller does not receive a heartbeat within a predefined duration of time, the Intrusion Processing Module is declared to be in a fault state, and the controller must take appropriate safety actions.

In alternate embodiments of the present invention, further improvements may be made the overall system or station. Due to the 'noise' or unreliability of some network environments, not all packets sent by the Intrusion Processing Module are received by the controller. The protocol adhered to in sending data packets is UDP which does not guarantee delivery of data. For this reason, the Intrusion Processing Module is configurable so that when a valid intrusion is detected, the Side or Top Intrusion bit in the data packet can be set to true for an extended predefined period, even after the intrusion is no longer present. This is to ensure that an intrusion may be registered by the controller.

The top and side virtual curtains are configurable in their height and position relative to the scale conveyor. The percentage of either virtual curtain that falls outside of the depth image sensor's field of view is declared 'out of bounds'. Should the percentage of either virtual curtain that is 'out of bounds' exceed a predefined threshold, then the Intrusion Processing Module cannot be relied on to accurately check for intrusions and should be reconfigured.

If a point within the depth image sensor's field of view does not have a valid depth, that point is said to be 'invisible'. Reasons for there being invisible points within a depth image sensor's field of view include the following: sunlight in the depth image sensor's field of view; or a reflective surface in the depth image sensor's field of view e.g.
  a. If the sidebar is very reflective or
  b. if some portion of the luggage is very reflective or
  c. if a customer's clothing is reflective
  d. An object, person or other is obscuring the depth image sensor's field of view by covering its Infrared camera
  e. An oversize piece of luggage is too close to the depth image sensor
  f. Should the percentage of either virtual curtain that is 'invisible' exceed a predefined threshold, then the Intrusion Processing Module should not be relied on to accurately check for intrusions and should preferably be reconfigured.

Additional Preferred Features

The Dynamic Virtual Box could be further improved to taper towards the virtual side curtain, i.e. towards the user, thereby further decreasing the chance of accidental intrusions, which may be due to the user's or passenger's swinging handbag straps.

A preferred embodiment of the present invention may also include a processing station for registering a passenger's luggage for a trip, the processing station comprising a luggage transportation tub having a first shape, the tub being adapted to receive a piece of luggage associated with the passenger; an injector for receiving the tub with the luggage therein; at least one camera associated with the injector, wherein the camera is positioned so as to allow an image of tub with the luggage to be taken; and a controller associated with the camera, the controller being adapted to control operation of the camera and wherein the controller compares the image to a database of predefined tub shapes.

Preferably, the controller may confirm the use of the tub with the passenger by using the earlier described touch screen interface or controller. The controller may also measure the weight of the luggage and tub through the use of a weight sensor located in the injector conveyor and then the controller may automatically subtract the weight of the tub from a recorded luggage weight associated with said passenger.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

What is claimed is:

1. A luggage processing station for registering a piece of passenger's luggage for a trip, wherein the processing station comprising:
    an injector for receiving the piece of luggage associated with the passenger;
    a group of sensors comprising a first sensor associated with the injector, the group of sensors, in combination with at least the floor of the injector, creating a zone around the piece of luggage; and
    a controller associated with the sensor being adapted to: monitor, via the group of sensors, intrusions through the zone to determine one or more of whether a predetermined limit on dimensions of the piece of luggage has been exceeded or whether a foreign object has intruded the zone from outside, and allow further processing of the piece of luggage only if no intrusion of the zone is detected;
    wherein the controller dynamically adjusts the volume of the zone to accommodate different sizes of luggage.

2. The luggage processing station according to claim 1, wherein the zone encompasses the piece of luggage at a distance of between 1 mm to 1 m from the outer perimeter of the piece of luggage.

3. The luggage processing station according to claim 1, wherein the group of sensors includes a camera.

4. The luggage processing station according to claim 1, wherein the group of sensors includes a stereotypic camera.

5. The luggage processing station according to claim 1, wherein the group of sensors includes an infrared spectrum sensor.

6. The luggage processing station according to claim 1, wherein the luggage processing station includes three or more sensors.

7. The luggage processing station according to claim 1, wherein the luggage processing station includes at least one barcode reader.

8. The luggage processing station according to claim 1, wherein the injector includes no physical walls other than the floor.

9. The luggage processing station according to claim 1, wherein the injector includes at least a physical front wall, a physical side wall and a physical floor.

10. The luggage processing station according to claim 1, wherein the zone includes convex or concave walls.

11. The luggage processing station according to claim 1, wherein the zone includes at least one virtual wall that tapers towards the centre of the injector.

12. The luggage processing station according to claim 3, wherein the group of sensors are directed towards the centre of the injector wherein the luggage is received, when in use.

13. The luggage processing station according to claim 1, wherein the zone includes a virtual top wall which is generally parallel to a floor of the injector when the height of the virtual top wall is below a minimum threshold.

14. A luggage processing station for registering a passenger's luggage for a trip, wherein the processing station comprising:
    a luggage transportation tub having a first shape, the tub being adapted to receive the piece of luggage associated with the passenger;
    an injector for receiving the tub with the piece of luggage therein;
    a group of sensors comprising a first sensor, the group of sensors associated with the injector, wherein the first sensor of the group of sensors is positioned so as to allow an image of tub with the luggage to be taken; and
    a controller associated with the group of sensors, the controller being adapted to control the operation of the first sensor of the group of sensors and wherein the controller compares the image to a database of predefined tub shapes.

15. The luggage processing station of claim 14, wherein the controller confirms with the passenger the use of the tub.

16. The luggage processing station of claim 14, wherein the injector includes a weighing sensor electrically connected to the controller.

17. The luggage processing station of claim 16, wherein the controller using the weighing sensor measures the combined weight of the luggage and tub and then subtracts the weight of the tub from combined weight and records the result against the passenger's flight information.

18. The luggage processing station of claim 14, wherein the first sensor is a camera.

* * * * *